US012339629B1

(12) United States Patent
Wu

(10) Patent No.: US 12,339,629 B1
(45) Date of Patent: Jun. 24, 2025

(54) ANTENNA WATCH

(71) Applicant: Shenzhen Amazwear Technology CO., LTD., Shenzhen (CN)

(72) Inventor: Xianghua Wu, Wuhan (CN)

(73) Assignee: Shenzhen Amazwear Technology CO., LTD., Shenzhen (CN)

(*) Notice: Subject to any disclaimer, the term of this patent is extended or adjusted under 35 U.S.C. 154(b) by 0 days.

(21) Appl. No.: 19/053,743

(22) Filed: Feb. 14, 2025

(51) Int. Cl.
*G04G 17/04* (2006.01)
*H01Q 1/27* (2006.01)

(52) U.S. Cl.
CPC ............ *G04G 17/04* (2013.01); *H01Q 1/273* (2013.01)

(58) Field of Classification Search
CPC ........ G04G 17/04; G04G 21/04; H01Q 1/273; G06Q 20/321; G04R 60/08; G04R 60/10; G04R 60/12
See application file for complete search history.

(56) References Cited

U.S. PATENT DOCUMENTS

| | | | | |
|---|---|---|---|---|
| 7,215,600 | B1 * | 5/2007 | DeRosa | H04B 1/385 368/278 |
| 9,612,582 | B1 * | 4/2017 | Wang | G04G 21/04 |
| 11,095,021 | B2 * | 8/2021 | Sung | H01Q 1/273 |
| 2023/0048160 | A1 * | 2/2023 | Navellou | A61B 5/02438 |

* cited by examiner

*Primary Examiner* — Edwin A. Leon
(74) *Attorney, Agent, or Firm* — Birchwood IP

(57) ABSTRACT

An antenna watch is provided, which includes a watch case, a watch cover, a bottom case, and a circuit module. The watch cover is fixedly provided on one side of the watch case, the bottom case is fixedly provided on the other side of the watch case, the circuit module is provided inside the watch case, and a display screen is provided between the watch case and the watch cover; the watch cover includes a first cover and a second cover. The second cover is located between the first cover and the watch case, and both the first cover and the second cover are fixedly connected to the watch case; the second cover is a conductor antenna, made of metal material, and exposed outside the antenna watch. This application has the effect of reducing the cost of receiving antennas and improving the strength of the watch body.

7 Claims, 11 Drawing Sheets

ANTENNA WATCH

TECHNICAL FIELD

The present disclosure relates to the field of watch technologies, and in particular, to a new type of antenna watch.

BACKGROUND

With the development and progress of mobile communication systems, the functions of watches are becoming more and more diversified, the watches provide a user with a lot of convenience. Many existing watches use GPS antennas to receive satellite signals and amplify them to process chips. Therefore, those with this function do not lack a part, as the receiving demand requires conductor materials to extend the wavelength and frequency amplification of this part.

At present, there are generally the following types of receiving antennas.

LDS antenna: a conductor developed from plastic after laser engraving is used as the antenna, and the rest of the part remains non-conductive and does not interfere with its signal. The disadvantage is that the process is complex, and the cost is high; this product has a strong plastic feel and no texture; due to the plastic material, the overall strength of the watch body is insufficient.

FPC and external antenna: adding conductors suitable for the corresponding wavelength inside the plastic shell as antennas has the disadvantage of large volume and require specific external dimensions, otherwise it is difficult to process. This product has a strong plastic feel and no texture. Due to the plastic material, the overall strength of the watch body is insufficient. And because the frequency band required for GPS reception is mostly ultra-low frequency, which requires ultra long bandwidth, and the small size of wearable devices, it is difficult to meet practical requirements by using externally attached conductors.

Ceramic antenna: it has advantages of achievable performance but dual frequency requirements. The disadvantage thereof is that the case cannot be made of metal, otherwise it will shield the reception of the ceramic antenna, and it is high cost.

SUMMARY

In order to meet the demand for reducing the cost of receiving antennas and improving the strength of a watch body, the present application provides a new type of antenna watch.

The antenna watch provided in this application adopts the following technical solution.

An antenna watch, including a watch case, a watch cover, a bottom case, and a circuit module, where the watch cover is fixedly provided on one side of the watch case, the bottom case is fixedly provided on the other side of the watch case, the circuit module is provided inside the watch case, and a display screen is provided between the watch case and the watch cover;

where the watch cover includes a first cover and a second cover, the second cover is located between the first cover and the watch case; both the first cover and the second cover are fixedly connected to the watch case; the second cover is a conductor antenna, made of metal material, and exposed outside the antenna watch.

By adopting the above technical solution, when the ground feeding point is disconnected from the metal case in an appropriate manner, it will change an original continuous flow path of current on the annular conductor. The originally uniformly distributed current state inside the metal case is broken, thereby forming specific current boundary conditions at a disconnection point, which causes the current to form different distribution situations on two sides of the disconnection, guiding the current to be distributed in a way that is conducive to resonance at the wavelength frequency points corresponding to L1 and L5 frequency bands.

Due to the understanding of the size of the metal case, combined with the adjustment of the current distribution and equivalent inductance and capacitance after the ground feeding point is disconnected, the antenna can meet the resonance condition in this frequency band, that is, the input impedance is close to pure resistance, thereby achieving good matching with the feeding network, and effectively radiating and receiving electromagnetic waves corresponding to the L1 and L5 frequency bands, achieving the goal of covering the wavelength frequency points of this frequency band.

In some embodiments of the present application, the second cover is provided with a ground feeding point, a first antenna part, and a second antenna part; the first antenna part and the second antenna part are disconnected through the ground feeding point; the first antenna part and the second antenna part are provided with a feeding terminal; the first antenna part receives a L5 frequency, and the second antenna part receives a L1 frequency.

In some embodiments of the present application, a material of the second cover is one of copper, stainless steel, aluminum, nickel plating and/or gold plating material.

In some embodiments of the present application, a first sealing ring is provided between the watch cover and the display screen, and the first sealing ring is fixedly provided on the watch cover and abuts against the display screen.

In some embodiments of the present application, a connection ring is fixedly provided on one side of the display screen, a thickness of the connection ring is smaller than that of the display screen, the first sealing ring abuts against the connection ring, the watch cover is provided with a display groove that is penetrated, and one side of the display screen abuts against with a groove body of the display groove.

In some embodiments of the present application, a second sealing ring is provided between the watch case and the watch cover, and the second sealing ring is fixedly provided on the watch case or the watch cover and abuts against the watch cover or the watch case.

In some embodiments of the present application, a third sealing ring is provided between the first cover and the second cover, and the third sealing ring is fixedly provided on the first cover or the second cover and abuts against the second cover or the first cover.

In some embodiments of the present application, a fourth sealing ring is provided between the watch case and the bottom case, and the fourth sealing ring is fixedly provided on the watch case or the bottom case and abuts against the bottom case or the watch case.

In summary, this application includes at least one beneficial technical effect as follows.

When the ground feeding point is disconnected from the metal case in an appropriate manner, it will change an original continuous flow path of current on the annular conductor. The originally uniformly distributed current state inside the metal case is broken, thereby forming specific current boundary conditions at a disconnection point, which causes the current to form different distribution situations on two sides of the disconnection, guiding the current to be distributed in a way that is conducive to resonance at the wavelength frequency points corresponding to L1 and L5 frequency bands.

Due to the understanding of the size of the metal case, combined with the adjustment of the current distribution and equivalent inductance and capacitance after the ground feeding point is disconnected, the antenna can meet the resonance condition in this frequency band, that is, the input impedance is close to pure resistance, thereby achieving good matching with the feeding network, and effectively radiating and receiving electromagnetic waves corresponding to the L1 and L5 frequency bands, achieving the goal of covering the wavelength frequency points of this frequency band.

Numeral reference: 1—watch case; 11—button slot; 111—button body; 112—button spring; 12—power module; 13—charging rod; 14—loudspeaker; 15—connection block; 151—connection hole; 16—second sealing groove; 17—fourth sealing groove; 2—watch cover; 20—display groove; 21—first cover; 210—fixing hole; 211—fixing screw; 212—protective ring; 22—second cover; 221—third sealing groove; 222—ground feeding point; 223—first antenna part; 224—second antenna part; 2231—feeding terminal; 3—bottom case; 31—charging hole; 32—loudspeaker hole; 4—circuit module; 5—display screen; 51—connection ring; 61—first sealing ring; 62—second sealing ring; 63—third sealing ring; 64—fourth sealing ring.

DESCRIPTION OF EMBODIMENTS

Further detailed explanation of the present application will be provided in combination with FIGS. 1-11.

Figure 1:
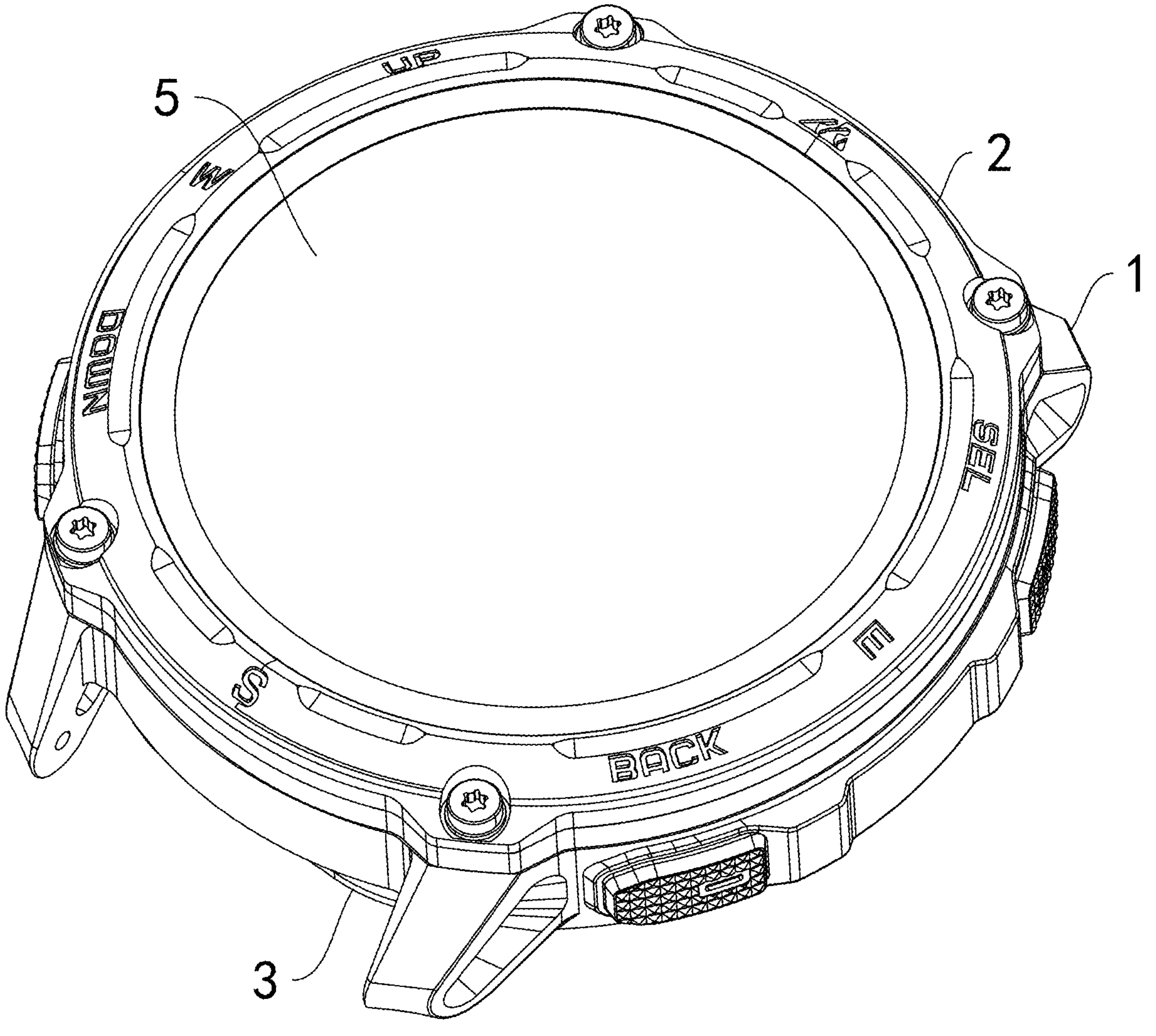
FIG. 1 is a schematic diagram of an overall structure of an embodiment of the present application.
Figure 2:
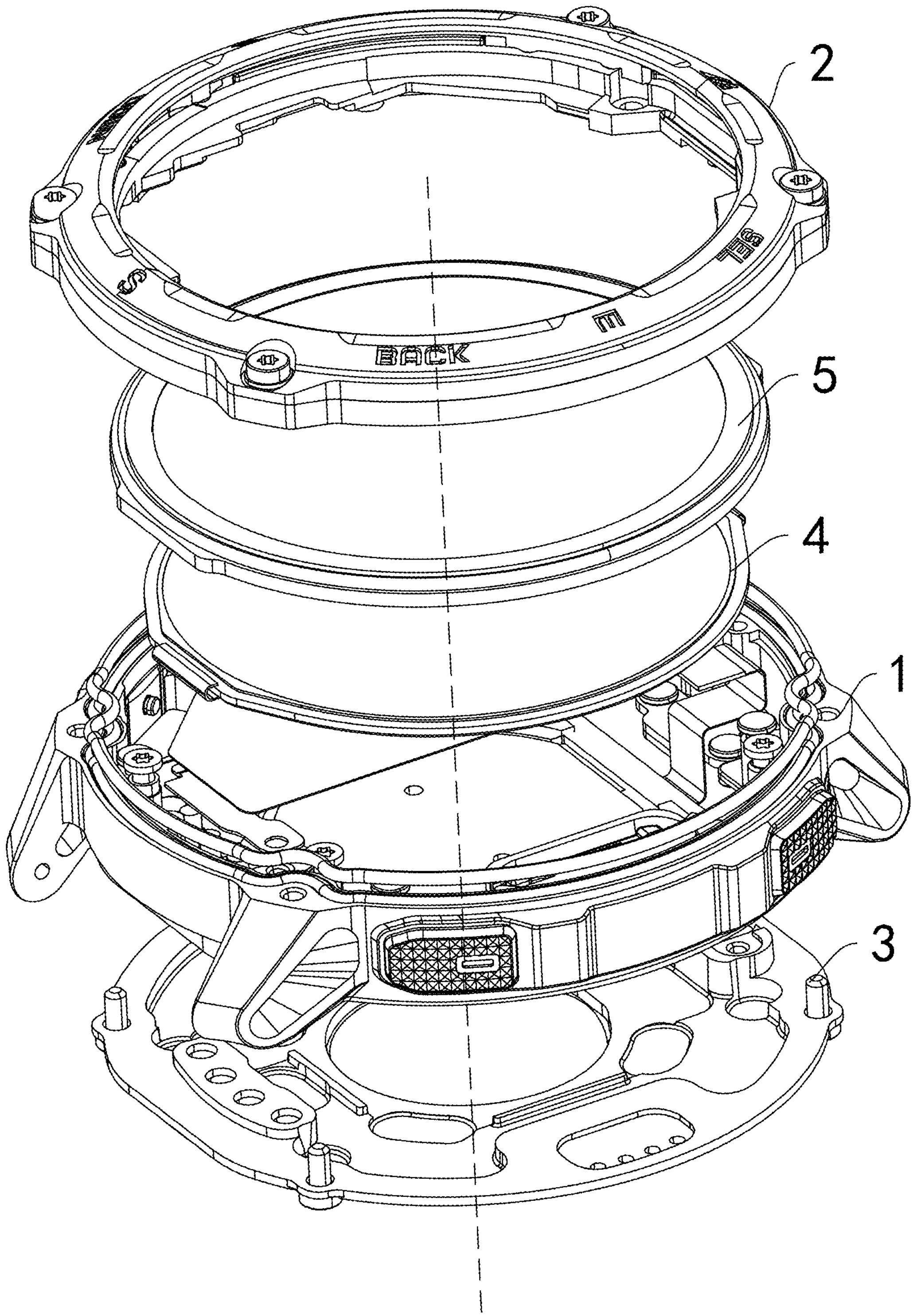
FIG. 2 is an exploded view of the overall structure of the embodiment of the present application.

The present application discloses a novel antenna watch. Referring to FIGS. 1 and 2, the antenna watch includes a watch case 1, a watch cover 2, a bottom case 3, and a circuit module 4. The watch case 1, the watch cover 2, and the bottom case 3 are rectangular in shape, the watch cover 2 is fixedly located on one side of the watch case 1, the bottom case 3 is fixedly located on the other side of the watch case 1, and the circuit module 4 is located inside the watch case 1.

Figure 3:
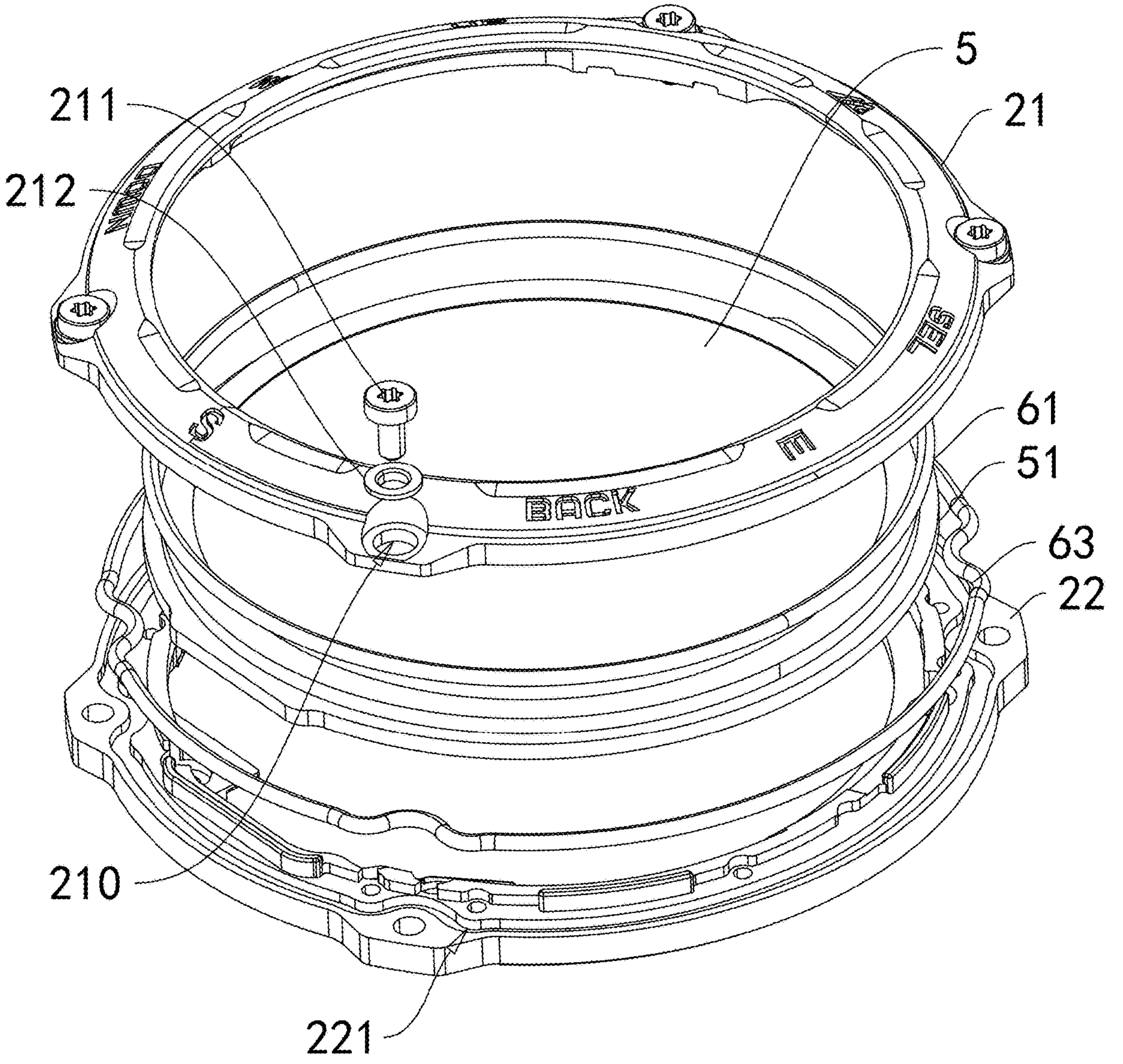
FIG. 3 is an exploded view of a watch cover in an embodiment of the present application.

Referring to FIG. 3, the watch cover 2 includes a first cover 21 and a second cover 22. The second cover 22 is located between the first cover 21 and the watch case 1 and is fixedly connected to the watch case 1 through a plurality of screws. The first cover 21 is provided with a plurality of fixing holes 210, and each fixing hole 210 is threaded with a fixing screw 211. Each fixing screw 211 is threaded through each fixing hole 210, and each fixing screw 211 is threaded through the second cover 22 and connected to the watch case 1, thereby further compressing and fixing the first cover 21 and the second cover 22 to the watch case 1. Each fixing hole 210 is provided with a protective ring 212. When each fixing screw 211 is threaded through each fixing hole 210, the fixing screws 211 are respectively threaded through and abut against each protective ring 212, and each protective ring 212 is wound around each fixing screw 211.

Figure 4:
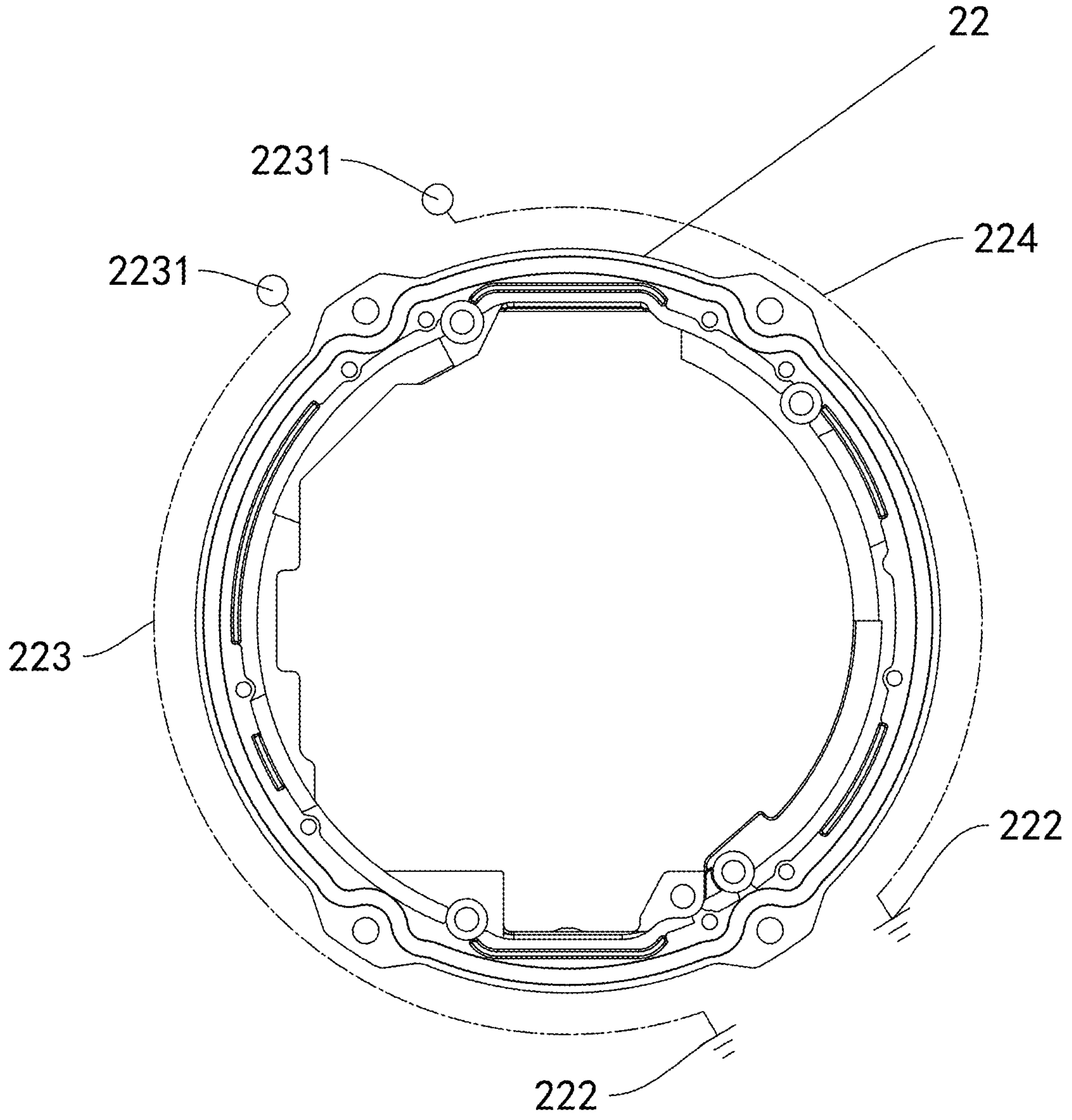
FIG. 4 is a schematic structural diagram of a second cover of the watch antenna in an embodiment of the present application.

Referring to FIG. 4, the second cover 22 is exposed outside the antenna watch. The second cover 22 is a conductor antenna with functions of capturing satellites, receiving satellite information, and processing satellite information. The second cover 22 is made of a metal material, and it is made of, one of copper, stainless steel, aluminum, nickel plating, and/or gold plating materials.

The second cover 22 is provided with a ground feeding point 222, a first antenna part 223, and a second antenna part 224. The first antenna part 223 and the second antenna part 224 are disconnected through the ground feeding point 222. The first antenna part 223 and the second antenna portion 224 are provided with a feeding terminal 2231; the feeding terminal 2231 receives satellite information. The first antenna part 223 receives a L5 frequency, and the second antenna part 224 receives a L1 frequency.

The design of the first antenna part 223 receiving the L5 frequency and the second antenna unit 224 receiving the L1 frequency can simultaneously receive satellite signals from two bands with higher accuracy.

Thus, achieving the following technical effects: by using the case as the receiving antenna eliminates the need for additional antenna costs; metal material renders its products more sturdy; the case, as an antenna, maximizes the reduction of electromagnetic wave interference from internal electronic components of wearable devices; and it is not constrained by the form of wearable devices.

Figure 5:
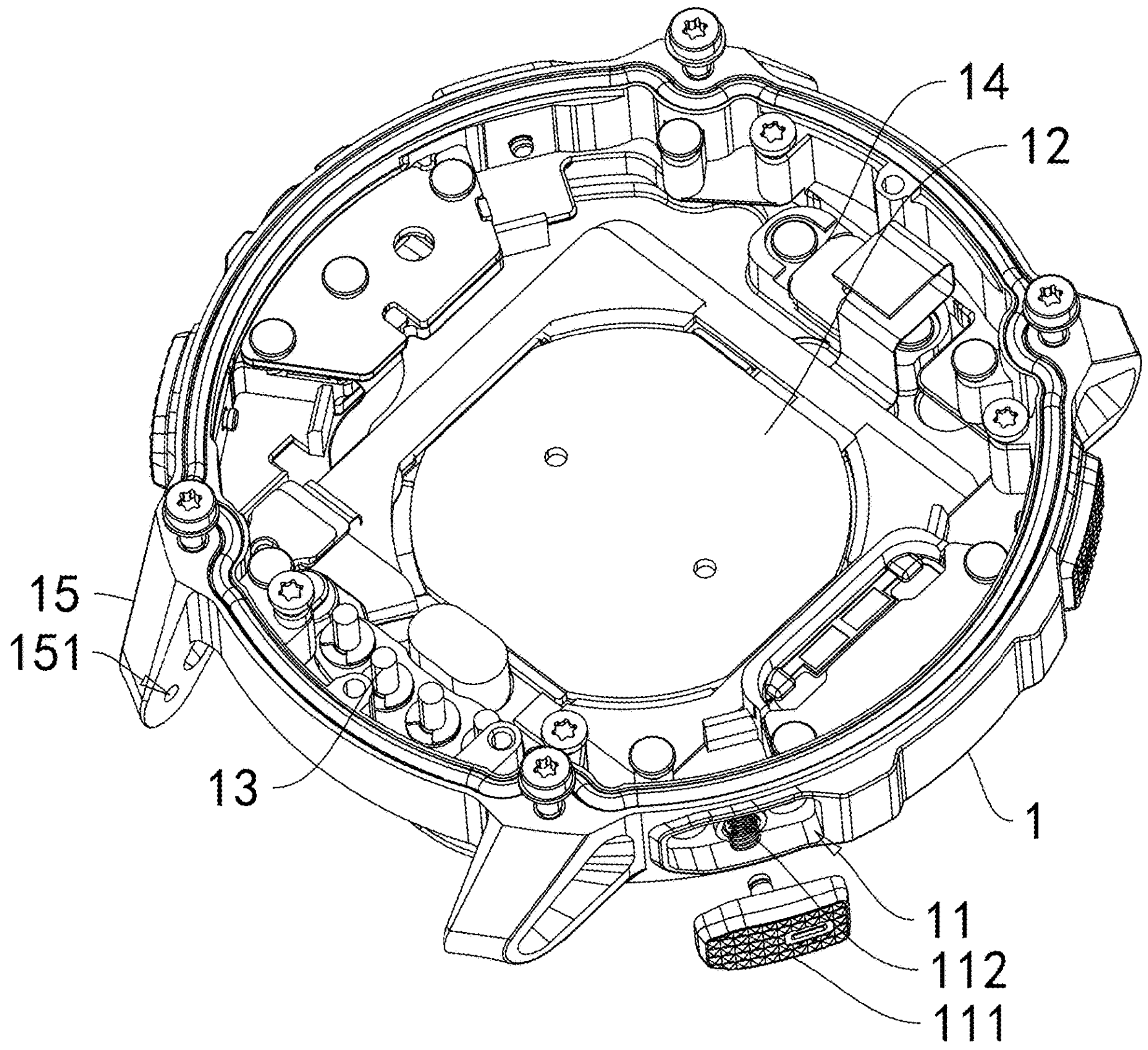
FIG. 5 is a schematic structural diagram of a watch case of an embodiment of the present application.

Referring to FIG. 5, there are a plurality of button slots 11 on an outer side of the watch case 1, each of button slot 11 is slidably provided with a button body 111. Button springs 112 are provided between each button body 111 and the watch case 1; one end of each button spring 112 is fixedly connected to each button body 111 and the other end thereof is fixedly connected to the watch case 1. Each button body 111 abuts against the buttons of the circuit module 4, and each button body 111 is configured to control and adjust the circuit module 4.

Referring to FIG. 5, a power module 12 is fixedly installed in a middle position inside the watch case 1. The power module 12 is electrically connected to the circuit module 4 and provides electrical energy to the circuit module 4. A plurality of charging rods 13 are also fixedly installed inside the watch case 1. The bottom case 3 is provided with a plurality of charging holes 31 that are penetrated. Each charging rod 13 runs through and is fixed to each charging hole 31. Each charging rod 13 is electrically connected to the circuit module 4 and configured to charge the power module 12.

Figure 6:
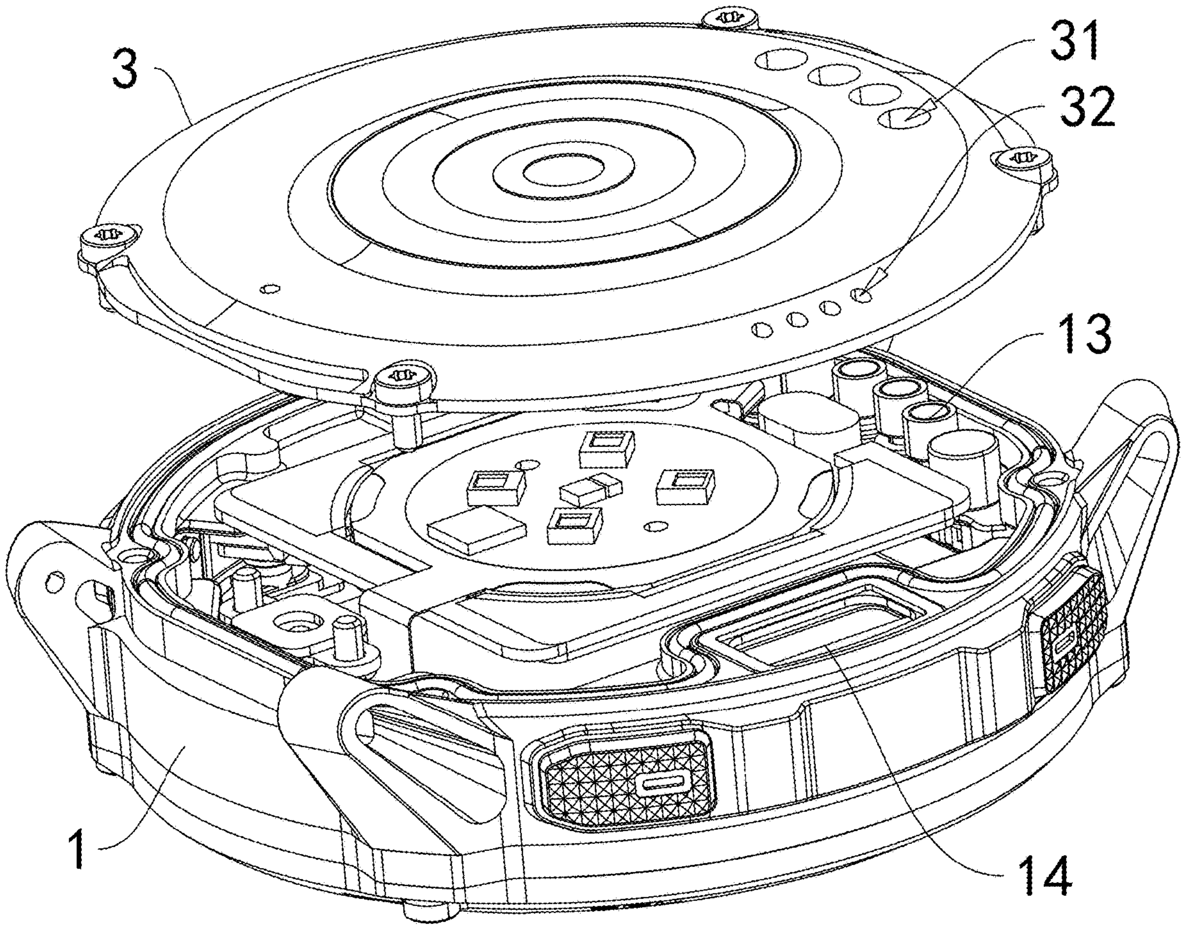
FIG. 6 is a schematic structural diagram of a bottom shell of an embodiment of the present application.

Referring to FIG. 6, a loudspeaker 14 is fixedly installed inside the watch case 1. The loudspeaker 14 is electrically connected to the circuit module 4 and plays the sound of the watch. The bottom case 3 is provided with a plurality of loudspeaker holes 32 that are penetrated, and each loudspeaker hole 32 is directly facing the loudspeaker 14.

Referring to FIG. 5, the watch case 1 is fixedly provided with two connection blocks 15 at two ends along a length direction. Each connection block 15 is provided with a connection hole 151, and each connection hole 151 is configured to connect with a watch strap of the watch.

Figure 7:
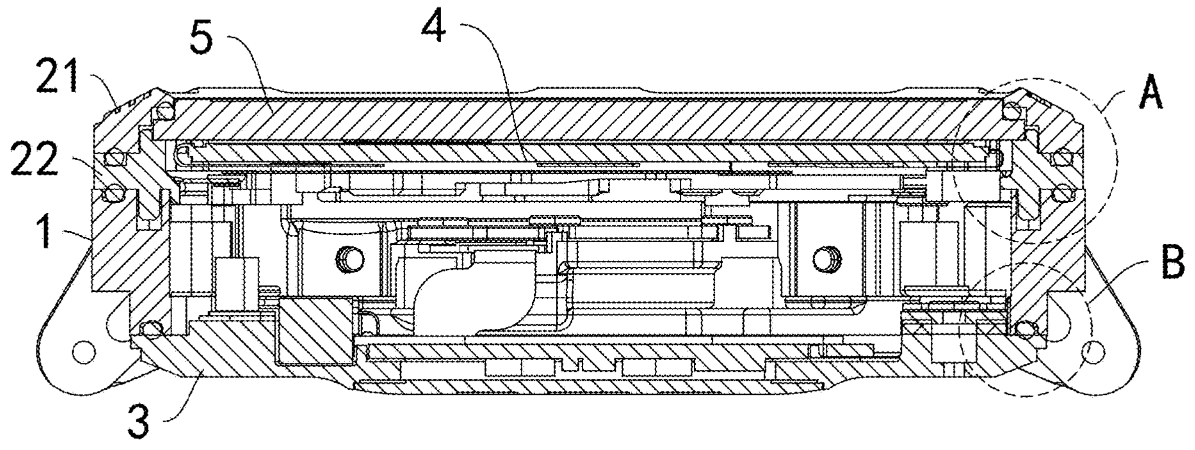
FIG. 7 is a sectional view of an overall structure of an embodiment of the present application.
Figure 8:
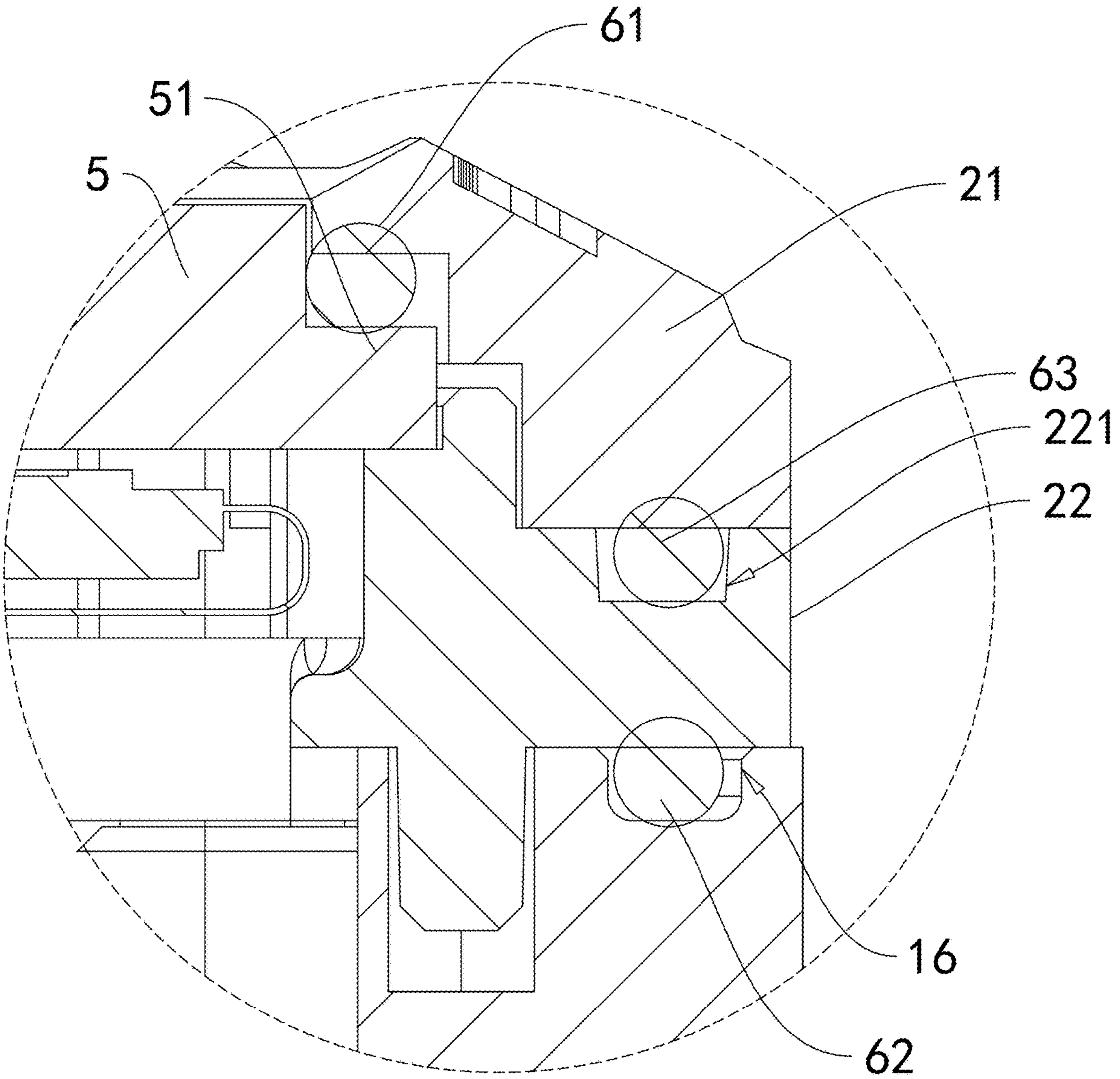
FIG. 8 is an enlarged view of part A of FIG. 7.

Referring to FIGS. 7 and 8, a display screen 5 is provided between the watch case 1 and the watch cover 2. The display screen 5 is located at a top of the circuit module 4 and is rectangular in shape. A connection ring 51 is fixedly provided on one side of the display screen 5, and a thickness of the connection ring 51 is smaller than that of the display screen 5. The connection ring 51 is facing the watch cover 2. A first sealing ring 61 is provided between the watch cover 2 and the connection ring 51, and the first sealing ring 61 is fixedly provided on the watch cover 2 and abuts against the connection ring 51. A display groove 20 is provided in a middle of the watch cover 2, and the display screen 5 is inserted into the display groove 20. One side of the display screen 5 abuts against a groove body of the display groove 20. The setting of the connection ring 51 renders it difficult for water to penetrate a connection position between the watch cover 2 and the display screen 5 and enters an interior of the watch case 1, thereby further increasing a sealing between the watch cover 2 and the display screen 5.

Figure 9:
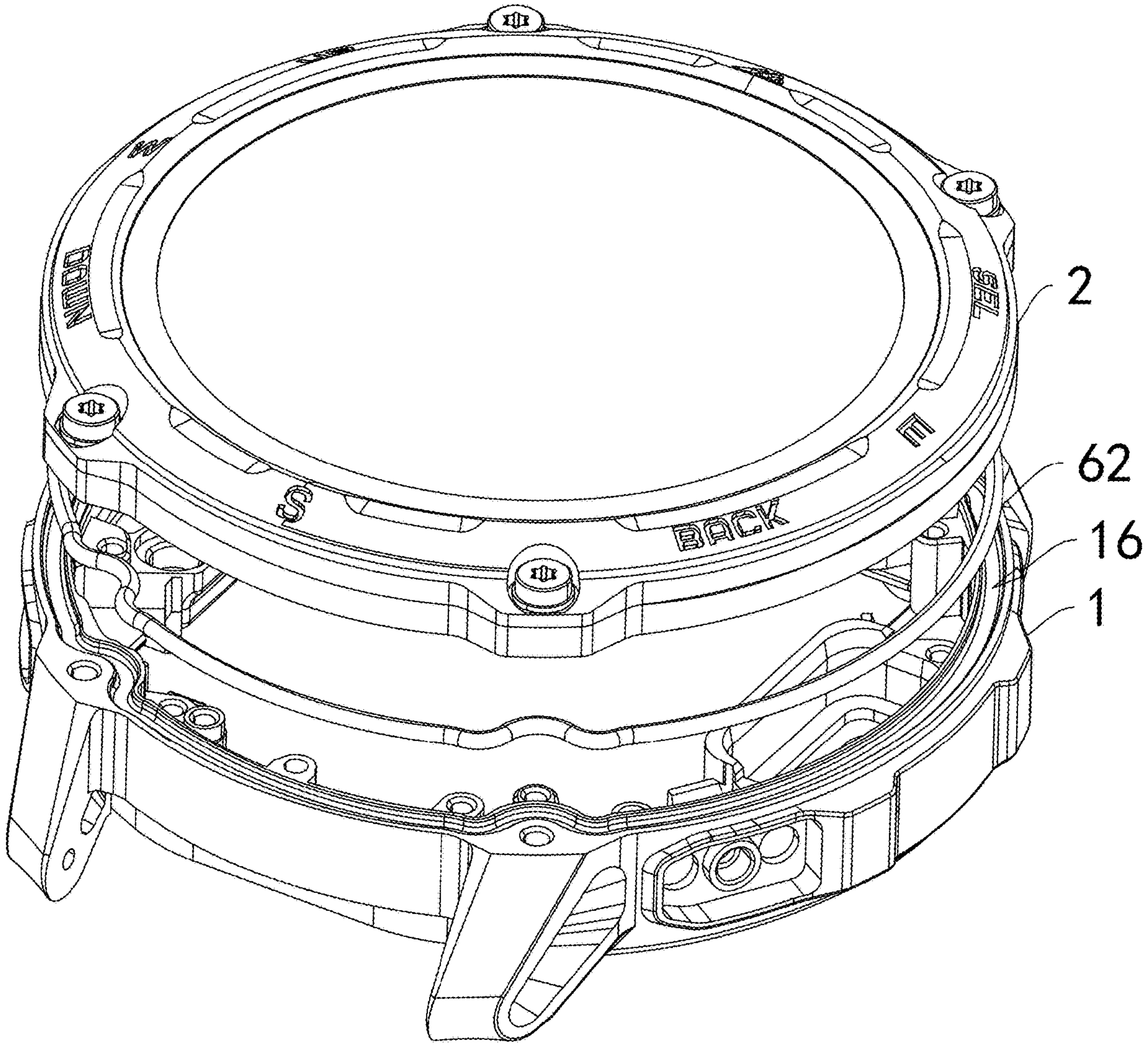
FIG. 9 is a schematic structural diagram of a second sealing ring in an embodiment of the present application.

Referring to FIGS. 7 and 9, a second sealing ring 62 is provided between the watch case 1 and the second cover 22. A second sealing groove 16 is provided on one side of the watch case 1 close to the second cover 22, and a groove body of the second sealing groove 16 is surrounded around the watch case 1. The second sealing ring 62 is inserted and clamped into the second sealing groove 16. The second sealing ring 62 abuts against the second cover 22 on one side near the second cover 22, and each fixing hole 210 is located outside the groove body of the second sealing groove 16, rendering it difficult for water to penetrate into the interior of the watch case 1 through each fixing hole 210, thereby further increasing a waterproof performance of the second sealing ring 62 and the waterproof performance of the watch.

Referring to FIGS. 7 and 8, a third sealing ring 63 is provided between the first cover 21 and the second cover 22. A third sealing groove 221 is provided on one side of the second cover 22 close to the first cover 21, and the third sealing groove 221 surrounds a length of the groove body along an edge of the second cover 22. The third sealing groove 221 is directly opposite to the second sealing groove 16. The third sealing ring 63 is inserted, fixed in the third sealing groove 221, and abuts against one side of the first cover 21 close to the second cover 22.

Figure 10:
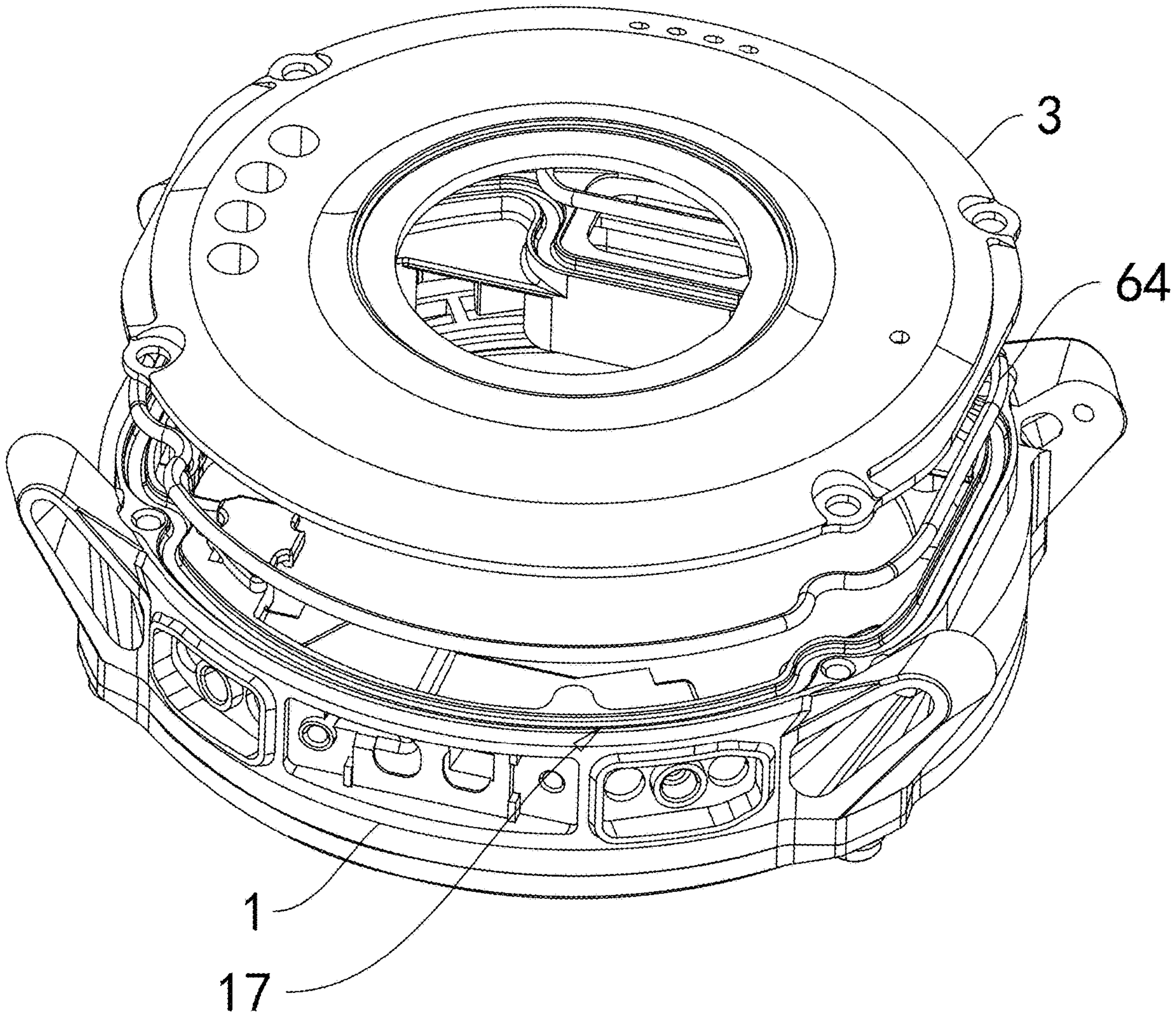
FIG. 10 is a schematic diagram of a fourth sealing ring structure in an embodiment of the present application.
Figure 11:
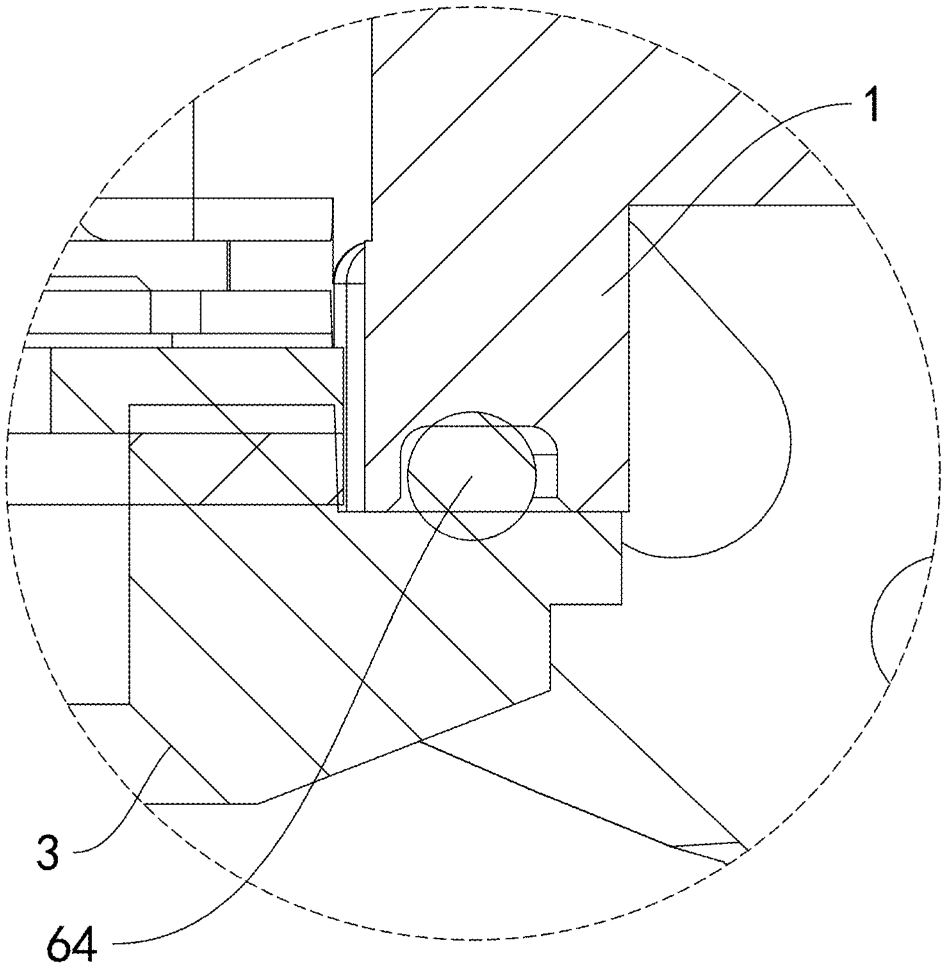
FIG. 11 is an enlarged view of part B of FIG. 7.

Referring to FIGS. 10 and 11, a fourth sealing ring 64 is provided between the watch case 1 and the bottom case 3. A fourth sealing groove 17 is provided on one side of the watch case 1 close to the bottom case 3. The fourth sealing ring 64 is inserted, fixed in the fourth sealing groove 17, and abuts against the bottom case 3. Each loudspeaker hole 32 is located outside the fourth sealing groove 17, thereby further enhancing the waterproof effect of the fourth sealing ring 64.

The implementation principle of the antenna watch in the present application is that when the ground feeding point 222 is disconnected from the metal casing in an appropriate manner, it will change an original continuous flow path of current on the annular conductor. The originally uniformly distributed current state inside the metal case is broken, thereby forming specific current boundary conditions at a disconnection point, which causes the current to form different distribution situations on two sides of the disconnection, guiding the current to be distributed in a way that is conducive to resonance at the wavelength frequency points corresponding to L1 and L5 frequency bands.

Due to the understanding of the size of the metal case, combined with the adjustment of the current distribution and equivalent inductance and capacitance after the ground feeding point 222 is disconnected, the antenna can meet the resonance condition in this frequency band, that is, the input impedance is close to pure resistance, thereby achieving good matching with the feeding network, and effectively radiating and receiving electromagnetic waves corresponding to the L1 and L5 frequency bands, achieving the goal of covering the wavelength frequency points of this frequency band.

The above are the preferred embodiments of the present application and do not limit the protection scope of the present application. Therefore, any equivalent changes made according to the structure, shape, and principle of the present application should be included in the protection scope of the present application.

What is claimed is:

1. An antenna watch, comprising a watch case, a watch cover, a bottom case, and a circuit module, wherein the watch cover is fixedly provided on one side of the watch case, the bottom case is fixedly provided on the other side of the watch case, the circuit module is provided inside the watch case, and a display screen is provided between the watch case and the watch cover;

wherein the watch cover comprises a first cover and a second cover, the second cover is located between the first cover and the watch case;

both the first cover and the second cover are fixedly connected to the watch case;

the second cover is a conductor antenna, made of metal material, and exposed outside the antenna watch;

wherein the second cover is provided with a ground feeding point, a first antenna part, and a second antenna part;

the first antenna part and the second antenna part are disconnected through the ground feeding point;

the first antenna art and the second antenna art are provided with a feeding terminal;

the feeding terminal receives satellite information the first antenna art receives a L5 frequency, and the second antenna part receives a L1 frequency.

2. The antenna watch according to claim 1, wherein a material of the second cover is one of copper, stainless steel, aluminum, nickel plating and/or gold plating material.

3. The antenna watch according to claim 1, wherein a first sealing ring is provided between the watch cover and the display screen, and the first sealing ring is fixedly provided on the watch cover and abuts against the display screen.

4. The antenna watch according to claim 3, wherein a connection ring is fixedly provided on one side of the display screen, a thickness of the connection ring is smaller than that of the display screen, the first sealing ring abuts against the connection ring, the watch cover is provided with a display groove that is penetrated, and one side of the display screen abuts against with a groove body of the display groove.

5. The antenna watch according to claim 3, wherein a second sealing ring is provided between the watch case and the watch cover, and the second sealing ring is fixedly provided on the watch case or the watch cover and abuts against the watch cover or the watch case.

6. The antenna watch according to claim 5, wherein a third sealing ring is provided between the first cover and the second cover, and the third sealing ring is fixedly provided on the first cover or the second cover and abuts against the second cover or the first cover.

7. The antenna watch according to claim 3, wherein a fourth sealing ring is provided between the watch case and the bottom case, and the fourth sealing ring is fixedly provided on the watch case or the bottom case and abuts against the bottom case or the watch case.

* * * * *